(12) United States Patent
Kim et al.

(10) Patent No.: US 9,299,972 B2
(45) Date of Patent: Mar. 29, 2016

(54) RECHARGEABLE BATTERY WITH SEPARATING MEMBER BETWEEN CURRENT COLLECTOR AND BATTERY CASE

(75) Inventors: Duk-Jung Kim, Yongin-si (KR); Joong-Heon Kim, Yongin-si (KR)

(73) Assignees: SAMSUNG SDI CO., LTD, Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 566 days.

(21) Appl. No.: 13/439,381

(22) Filed: Apr. 4, 2012

(65) Prior Publication Data
US 2013/0078505 A1 Mar. 28, 2013

Related U.S. Application Data

(60) Provisional application No. 61/540,226, filed on Sep. 28, 2011.

(51) Int. Cl.
*H01M 2/02* (2006.01)
*H01M 2/26* (2006.01)
(Continued)

(52) U.S. Cl.
CPC .............. *H01M 2/263* (2013.01); *H01M 2/18* (2013.01); *H01M 10/0431* (2013.01); *H01M 2/0217* (2013.01); *H01M 2/06* (2013.01);
(Continued)

(58) Field of Classification Search
CPC ... H01M 2/0473; H01M 2/06; H01M 2/1094; H01M 2/305; H01M 2/021; H01M 2/18; H01M 2/263; H01M 10/0431; H01M 2/0217; H01M 10/0463; H01M 10/049; H01M 10/0587; Y02E 60/12

USPC .................................. 429/163, 180, 179, 185
See application file for complete search history.

(56) References Cited

U.S. PATENT DOCUMENTS 7,989,100 B2   8/2011  Matsumoto et al.
2002/0039679 A1*  4/2002  Akita et al. ................... 429/183
(Continued)

FOREIGN PATENT DOCUMENTS

CN    1728432 A     2/2006
JP    47-22440 U    11/1972
(Continued)

OTHER PUBLICATIONS

Search Report mailed Jul. 17, 2014 in corresponding European Patent Application No. 12178842.6.
(Continued)

*Primary Examiner* — Gary Harris
(74) *Attorney, Agent, or Firm* — Lee & Morse, P.C.

(57) ABSTRACT

A battery includes an electrode assembly, the electrode assembly including a positive electrode, a negative electrode, and a separator interposed between the positive electrode and the negative electrode, a current collector, the current collector being electrically and mechanically coupled to one of the electrodes, a case, the electrode assembly and the current collector being disposed within the case, a cap plate, the cap plate having a terminal protruding therefrom, the terminal being electrically coupled to the current collector, and a separating member, the separating member having a protrusion portion and a body portion, the protrusion portion being fixed to the cap plate, and the body portion extending along a length of the current collector and being interposed between the current collector and an inner wall of the case.

19 Claims, 11 Drawing Sheets

(51) Int. Cl.
  *H01M 2/18* (2006.01)
  *H01M 10/04* (2006.01)
  *H01M 2/06* (2006.01)
  *H01M 10/0587* (2010.01)

(52) U.S. Cl.
  CPC ........ *H01M 10/049* (2013.01); *H01M 10/0463* (2013.01); *H01M 10/0587* (2013.01)

(56) References Cited

U.S. PATENT DOCUMENTS

2006/0024578 A1* 2/2006 Lee ............................... 429/208
2011/0104559 A1* 5/2011 Kim et al. ...................... 429/163
2011/0311851 A1* 12/2011 Shinoda et al. ................. 429/94

FOREIGN PATENT DOCUMENTS

| KR | 10-2009-0035328 A | 4/2009 |
| KR | 10-1011179 B1 | 1/2011 |

OTHER PUBLICATIONS

Office Action mailed Oct. 10, 2015 in corresponding Chinese Patent Application No. 201210331467.5.

* cited by examiner

RECHARGEABLE BATTERY WITH SEPARATING MEMBER BETWEEN CURRENT COLLECTOR AND BATTERY CASE

CROSS-REFERENCE TO RELATED APPLICATION

The present application claims priority under 35 U.S.C. §119(e) to U.S. Provisional Application No. 61/540,226, filed on Sep. 28, 2011, and entitled: "Rechargeable Battery," which is incorporated by reference herein in its entirety.

BACKGROUND

1. Field

Embodiments relate to a rechargeable battery.

2. Description of the Related Art

A rechargeable battery can be repeatedly charged and discharged. A low capacity rechargeable battery has been used for small electronic devices such as mobile phones, laptop computers, and camcorders, and a large capacity battery has been used as a power source for driving a motor of a hybrid vehicle. A high power rechargeable battery using high energy density non-aqueous electrolyte has also been developed.

The above information disclosed in this Background section is only for enhancement of understanding of the background of the described technology and therefore it may contain information that does not form the prior art.

SUMMARY

An embodiment is directed to a battery, including an electrode assembly, the electrode assembly including a positive electrode, a negative electrode, and a separator interposed between the positive electrode and the negative electrode, a current collector, the current collector being electrically and mechanically coupled to one of the electrodes, a case, the electrode assembly and the current collector being disposed within the case, a cap plate, the cap plate having a terminal protruding therefrom, the terminal being electrically coupled to the current collector, and a separating member, the separating member having a protrusion portion and a body portion, the protrusion portion being fixed to the cap plate, and the body portion extending along a length of the current collector and being interposed between the current collector and an inner wall of the case.

The battery may further include another current collector, the other current collector being coupled to another one of the electrodes, and another separating member, the other separating member having a body portion extending along the other current collector and being interposed between the other current collector and another inner wall of the case.

The separating member may include a supporting unit extending from a lower region of the separating member, the supporting unit extending along a bottom side of the electrode assembly.

The supporting unit may be interposed between the bottom side of the electrode assembly and a bottom interior surface of the case.

The battery may further include a fixing plate extending from the separating member into a center region of the electrode assembly.

The fixing plate may be configured to support the electrode assembly along an inner portion thereof.

The battery may further include another separating member, wherein the fixing plate extends toward another fixing plate in the center region of the electrode assembly, the other fixing plate extending from the other separating member.

The current collector may be between the separating member and the electrode assembly, and the fixing plate extends through an opening in the current collector.

The separating member and the fixing plate may be electrically insulating.

The separating member and the fixing plate may be formed as an integral unit.

The battery may further include another electrode assembly. The separating member may include another fixing plate extending from the separating member into a center region of the other electrode assembly.

The battery may further include first and second fixing walls extending from the separating member, the first and second fixing walls extending along respective outer surfaces of the electrode assembly.

The fixing walls may be configured to support the electrode assembly along the outer surfaces thereof.

The separating member and the fixing walls may be electrically insulating.

The battery may be a prismatic secondary battery.

The battery may further include an insulating member interposed between the protrusion portion and the cap plate.

The body portion may have a receiving groove therein, the receiving groove being configured to receive the current collector.

The body portion and the protrusion portion may have a receiving groove therein, the receiving groove being configured to receive the current collector in the body portion and the protrusion portion.

The protrusion portion may contact the cap plate.

Another embodiment is directed to a vehicle, including a power source, the power source providing a motive power for the vehicle, and at least one rechargeable battery configured to provide electricity to the power source. The at least one rechargeable battery may include an electrode assembly, the electrode assembly including a positive electrode, a negative electrode, and a separator interposed between the positive electrode and the negative electrode, a current collector, the current collector being electrically and mechanically coupled to one of the electrodes, a case, the electrode assembly and the current collector being disposed within the case, a cap plate, the cap plate having a terminal protruding therefrom, the terminal being electrically coupled to the current collector, and a separating member, the separating member having a protrusion portion and a body portion, the protrusion portion being fixed to the cap plate, and the body portion extending along a length of the current collector and being interposed between the current collector and an inner wall of the case.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
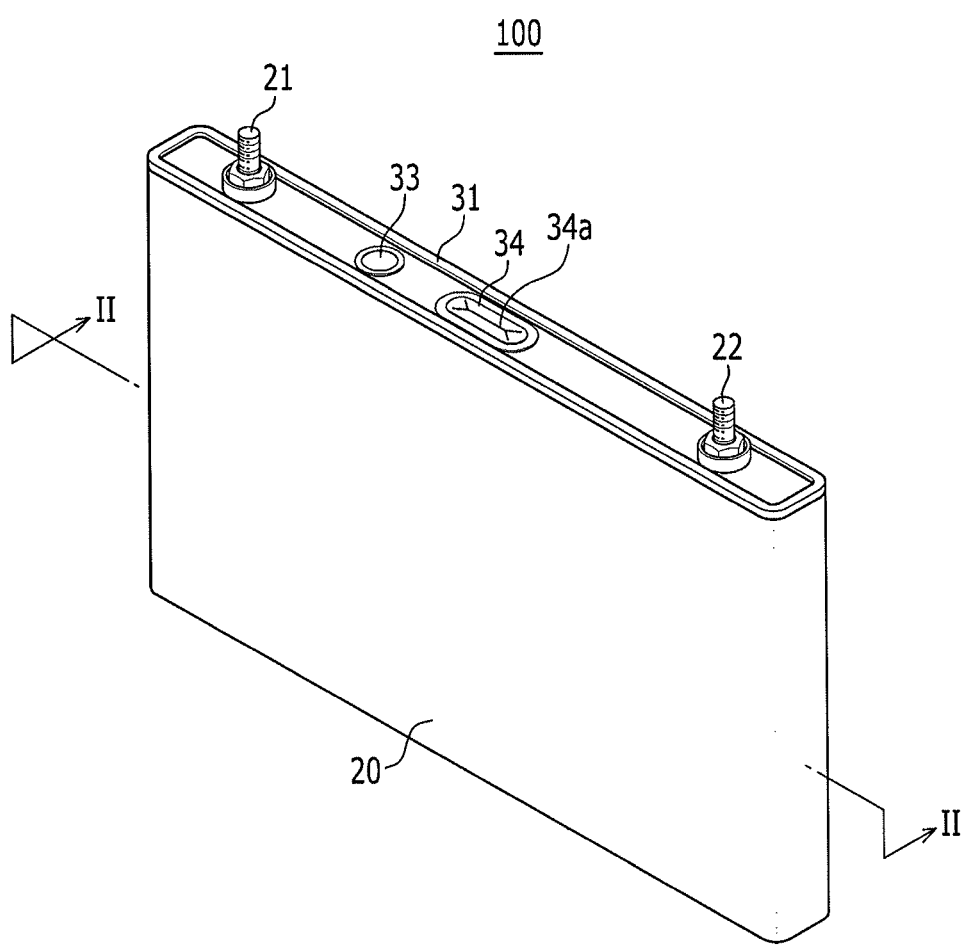
FIG. 1 illustrates a perspective view of a rechargeable battery according to a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two element, it can be the only element between the two elements, or one or more intervening elements may also be present. Like reference numerals refer to like elements throughout.

Figure 2:
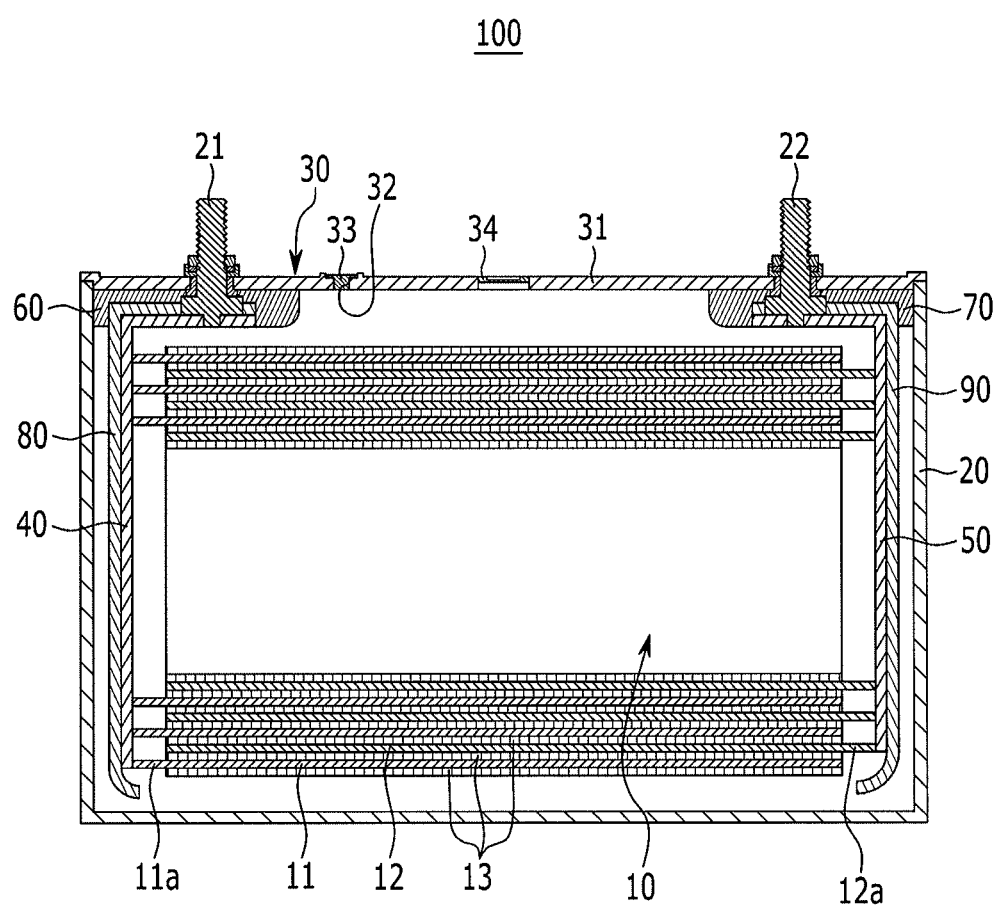
FIG. 2 illustrates a cross-sectional view taken along the line II-II of FIG. 1.

FIG. 1 illustrates a perspective view of a rechargeable battery according to the first example embodiment, and FIG. 2 illustrates a cross-sectional view taken along the line II-II of FIG. 1.

In the example embodiment shown in FIG. 1 and FIG. 2, a rechargeable battery 100 includes at least one electrode assembly 10 (which may be spiral-wound by locating a separator 13 between a positive electrode 11 and a negative electrode 12), a case 20 receiving the electrode assembly 10, and a cap assembly 30 coupled to an opening of the case 20.

The rechargeable battery 100 according to the present example embodiment may be a lithium ion rechargeable battery and may have a quadrangular or prismatic shape. Various forms of batteries such as a lithium polymer battery or a cylindrical battery may also be implemented.

The positive electrode 11 and the negative electrode 12 may each include coating regions (which are regions that are coated with an active material) and uncoated regions 11a and 12a (which are regions that are not coated with an active material) of a respective current collector, which may be formed with a thin plate of metal foil.

The positive electrode 11 and the negative electrode 12 may be spiral-wound with the separator 13, which is an insulator, located therebetween. In another implementation, and the electrode assembly 10 may be formed in a structure in which a positive electrode and a negative electrode are each formed with a plurality of sheets alternately stacked with a separator located therebetween.

The case 30 may form an entire exterior of the rechargeable battery 10, and may be made of a conductive metal such as aluminum, an aluminum alloy, or nickel-plated steel. The case 30 may provide a space incorporating the electrode assembly 10.

The cap assembly 30 may have a cap plate 31 covering the opening of the case 20. The case 20 and the cap plate 31 may each be electrically conductive. Here, positive and negative terminals 21 and 22 electrically connected to the positive electrode 11 or the negative electrode 12 may passed through the cap plate 31 and may be protruded outside.

Also, the external circumferential surface of the upper column of the positive and negative terminals 21 and 22 protruded outside the cap plate 31 may be screw-processed and may be fastened to the cap plate 31 by a nut.

In another implementation, and the positive and negative terminals 21 and 22 may be made of a rivet structure so as to be rivet-coupled, or may be weld-coupled to the cap plate 31.

Also, the cap plate 31 may be made of a thin plate to be coupled to the opening of the case 20, and an electrolyte injection opening 32 that may be installed with a seal stopper 33 may be formed to the cap plate 31. The cap plate 31 may have a vent unit 34 that is formed with a notch 34a.

The positive and negative terminals 21 and 22 may be electrically connected to positive and negative current collectors 40 and 50 that are coupled, e.g., weld-coupled, to the positive uncoated region 11a or the negative uncoated region 12a.

For example, the positive and negative terminals 21 and 22 may be weld-coupled to the positive and negative current collectors 40 and 50. In another implementation, the positive and negative terminals 21 and 22 and the positive and negative current collectors 40 and 50 may be integrally combined.

First and second lower insulating members 60 and 70 may be installed between the electrode assembly 10 and the cap plate 31. One end of first and second separating members 80 and 90 (which may each face a side of the electrode assembly 10) may be installed between the first and second lower insulating members 60 and 70 and the positive and negative terminals 21 and 22. The positive and negative terminals 21 and 22 weld-coupled to the positive and negative current collectors 40 and 50 may be coupled to ends of the first and second lower insulating members 60 and 70 and the first and second separating members 80 and 90.

Figure 3:
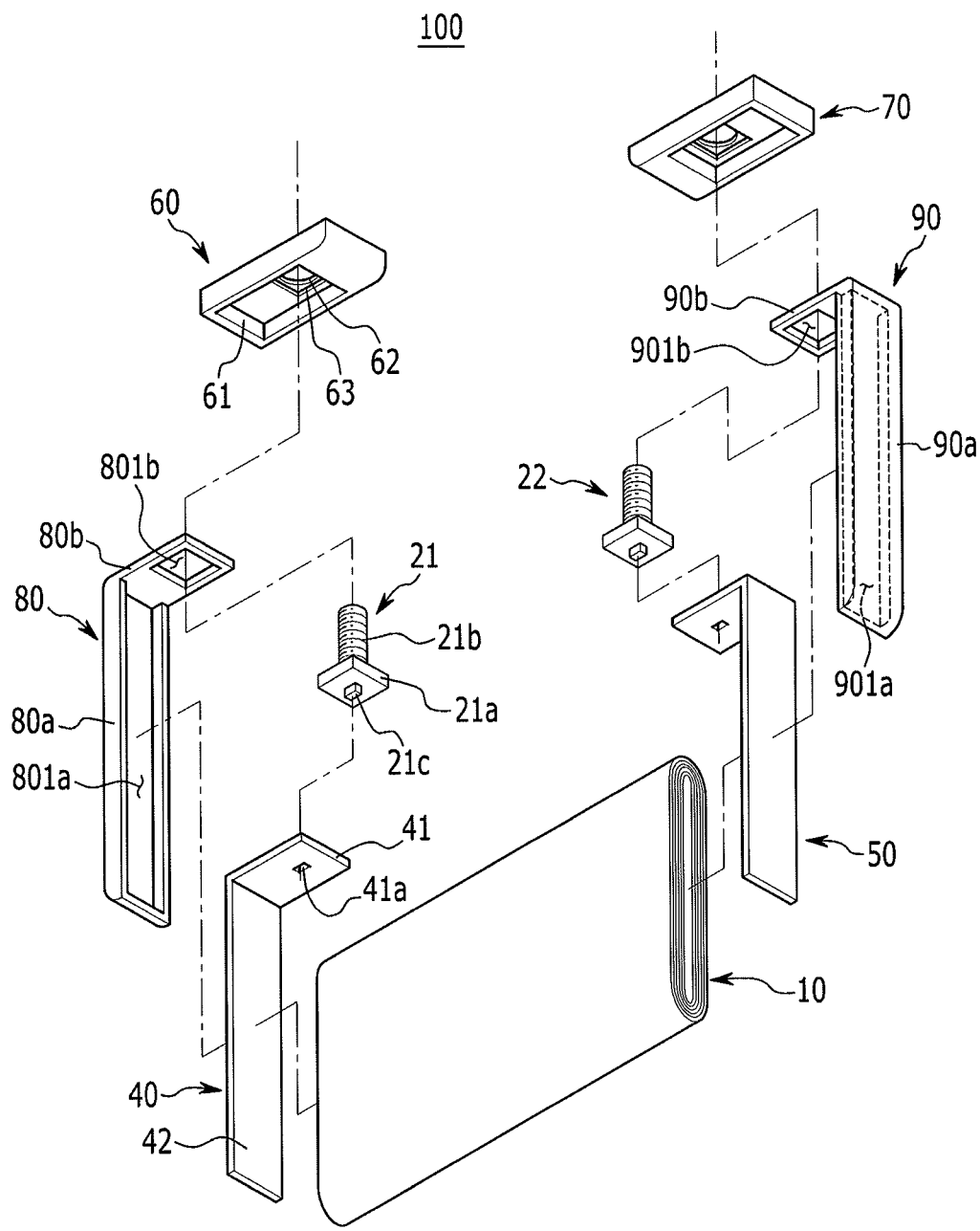
FIG. 3 illustrates a partial exploded perspective view of a rechargeable battery according to the first example embodiment.

FIG. 3 illustrates a partial exploded perspective view of a rechargeable battery according to the first example embodiment.

Referring to FIG. 3, the rechargeable battery according to the present example embodiment may include the electrode assembly 10, the positive and negative terminals 21 and 22, the positive and negative current collectors 40 and 50, the first and second lower insulating members 60 and 70, and the first and second separating members 80 and 90.

Each structure of the negative terminal 22, the negative current collector 40, and the second lower insulating member 70 according to the present example embodiment may be the same as each structure of the positive terminal 21, the positive current collector 40, and the first lower insulating member 60. Accordingly, the detailed description of the negative terminal 22, the negative current collector 50, and the second lower insulating member 70 is omitted.

The positive terminal 21 according to the present example embodiment may include a body 21b, a flange 21a, and a coupling protrusion 21c protruded from the flange 21a, and the positive current collector 40 may include a terminal coupling unit 41 formed with a terminal coupling groove 41a and an electrode current collector coupling unit 42.

For example, the terminal coupling groove 41a of the terminal coupling unit 41 may be inserted with the coupling protrusion 21c of the positive terminal 21 so as to be weld-coupled. In another implementation, the coupling protrusion 21c of the positive terminal 21 may be coupled to the coupling groove 41a formed to the terminal coupling unit 41 in a force fitting manner, e.g., by caulking or swaging.

The first lower insulating member 60 according to the present example embodiment may include a current collector receiving groove 61 (receiving the terminal coupling unit 41 of the positive current collector 40), a terminal through-hole 62 (through which the body 21b of the positive terminal 21 is passed), and a flange receiving groove 63 (receiving the flange 21a of the positive terminal 21).

Also, the first separating member 80 according to the present example embodiment may include a first body portion 80a that may face one side of the electrode assembly 10, and a first protrusion portion 80b that may be extended from one end of the first body portion 80a and including a positive terminal fixing groove 801b. The first protrusion portion 80b may be positioned for the positive terminal fixing groove 801b and the terminal through-hole 62 to face each other so as to be received in the current collector receiving groove 61 of the first lower insulating member 60.

Also, the body 21b of the positive terminal 21 may be passed through the positive terminal fixing groove 801b and the terminal through-hole 62 so as to be fixed to the cap plate 31 by the nut, and the flange 21a of the positive terminal 21 may be coupled to the positive terminal fixing groove 801b of the first protrusion portion 80b so as to be received in the flange receiving groove 63.

According to the present example embodiment, the first separating member 80 may be fixed to the flange 21a of the positive terminal 21 so as to be fixed between the first lower insulating member 60 and the positive terminal 21.

The first protrusion portion 80b of the first separating member 80 according to the present example embodiment may be protruded substantially perpendicular to the first body portion 80a. As shown in FIG. 3, the first body portion 80a of the first separating member 80 may be positioned to face one side of the electrode assembly 10, e.g., where the positive electrode uncoated region 11a coupled with the electrode current collector coupling unit 42 is positioned.

The positive current collector 40 according to the present example embodiment may be a brittle material, a flexible material, etc. For example, according to the present example embodiment, the positive current collector may be made of a flexible material, and may be fixed by the first separating member 80 after being weld-coupled to the positive electrode uncoated region 11a of the electrode assembly 10.

A first electrode assembly receiving groove 801a (that may receive the portion of the electrode assembly 10 where the positive electrode uncoated region 11a) is formed at one side of the first body portion 80a of the first separating member 80 according to the present example embodiment. The first separating member 80 may be made of an insulating material, for example an insulating resin. The portion of the electrode assembly 10 where the positive electrode uncoated region 11a coupled with the positive current collector 40 is formed may be received in the first electrode assembly receiving groove 801a.

The second separating member 90 according to the present example embodiment may include a second body portion 90a facing the other side of the electrode assembly 10. The second separating member 90 may include a second protrusion portion 90b extended from one end of the second body portion 90a. The second separating member may have a negative terminal fixing groove 901b. Also, a second electrode assembly receiving groove 901a (receiving the portion of the electrode assembly 10 wherein the negative uncoated region 12a is formed) may be formed at one side of the second body portion 90a. The second separating member 90 may be an insulating material, for example an insulating resin.

According to the present example embodiment, the second electrode assembly receiving groove 901a may receive the portion of the electrode assembly 10 where the negative uncoated region 12a coupled with the negative current collector 5 is formed.

The connection relation of the second separating member 90, the negative terminal 22, the negative current collector 50, and the second lower insulating member 70 according to the present example embodiment may be the same as the connection relation of the first separating member 80, the positive terminal 21, the positive current collector 40, and the first lower insulating member 60, such that the detailed description is omitted.

As shown in FIG. 3, the electrode assembly 10 according to the present example embodiment is positioned between the first separating member 80 and the second separating member 90 to be physically and electrically separated from the case 20. Thus, the first separating member 80 and the second separating member 90 may absorb an external impact such that damage to the electrode assembly 10 by the external impact may be prevented. Also, leakage of the current generated in the electrode assembly 10 to the outside through the case 20 may be prevented.

Figure 4:
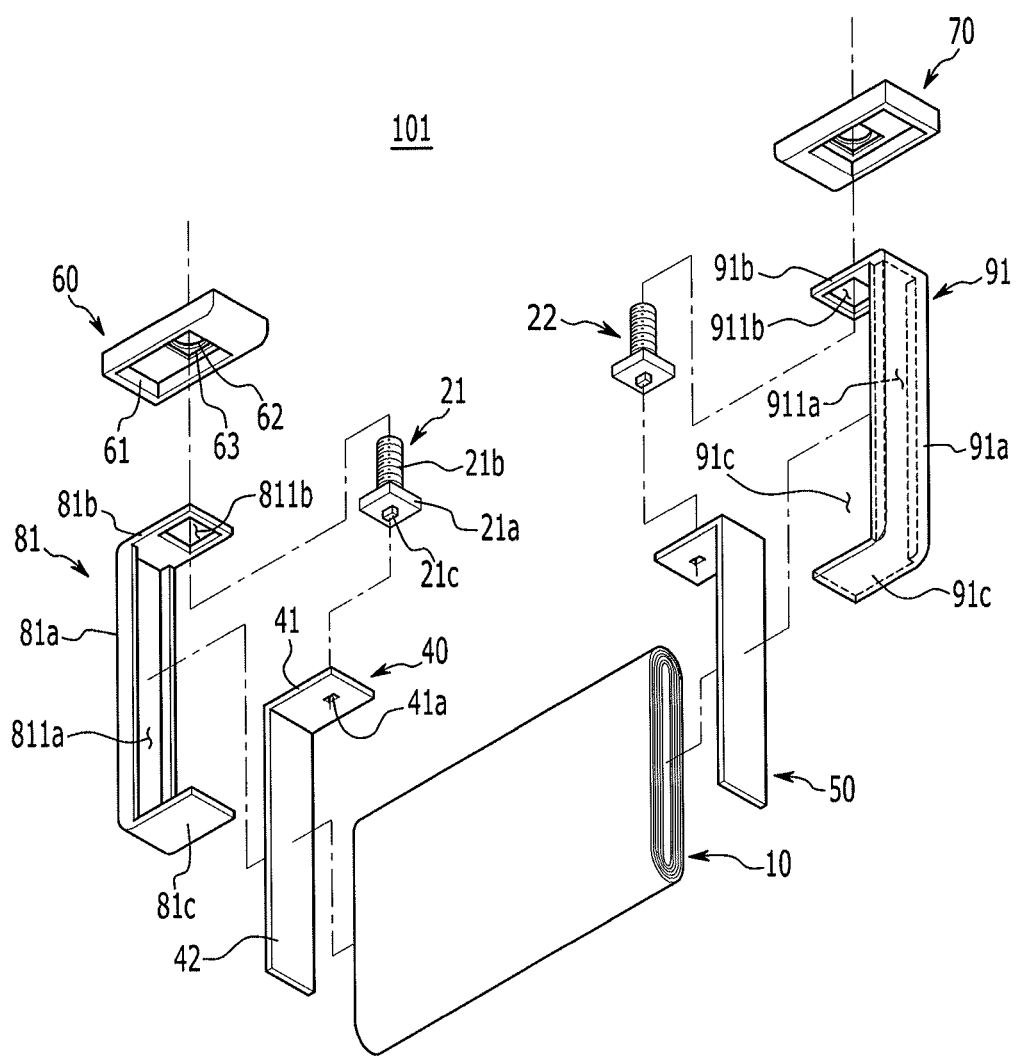
FIG. 4 illustrates a partial exploded perspective view of a rechargeable battery according to a variation of the first example embodiment.

FIG. 4 illustrates a partial exploded perspective view of a rechargeable battery according to a variation of the first example embodiment.

Referring to FIG. 4, a rechargeable battery 101 according to the present example embodiment is the same as rechargeable battery 100 according to the first example embodiment, except for first and second separating members 81 and 91, such that the detailed description of the same structure as in the first example embodiment is omitted.

The first separating member 81 according to the present example embodiment may include a first body portion 81a, a first protrusion portion 81b, and a first supporting unit 81c. The second separating member 91 may include a second body portion 91a, a second protrusion portion 91b, and a second supporting unit 91c.

The first and second bodies 81a and 91a of the first and second separating members 81 and 91 may include first and second electrode assembly receiving grooves 811a and 911a. The first and second protrusion portions 81b and 91b may include positive and negative terminal fixing grooves 811b and 911b.

The coupling relation of the first and second separating members 81 and 91, the current collectors 40 and 50, and the electrode assembly 10 according to the present example embodiment, except for the first and second supporting units 81c and 91c, is the same as the coupling relation of the first and second separating members 80 and 90, the current collectors 40 and 50, and the electrode assembly 10 according to the first example embodiment such that the detailed description thereof is omitted.

According to the present example embodiment, the first and second supporting units 81c and 91c of the first and second separating members 81 and 91 may be protruded at the end positioned opposite to the one end of the first and second bodies 81*a* and 91*a* where the first and second protrusion portions 81*b* and 91*b* are positioned. The first and second supporting units 81*c* and 91*c* may be formed substantially perpendicular to the first and second bodies 81*a* and 91*a*. Accordingly, the first and second supporting units 81*c* and 91*c* according to the present example embodiment may be positioned between one surface of the lower portion of the electrode assembly 10 and the bottom of the case 20 such that the electrode assembly 10 and the case 20 may be physically separated.

The first and second separating members 81 and 91 according to the present example embodiment may be made of the insulating material, for example the insulating resin. According to the present example embodiment, the first and second supporting units 81*c* and 91*c* may be positioned between the electrode assembly 10 and the case 20 such that the electrode assembly 10 and the case 20 may be electrically separated. The electrode assembly 10 between the first and second separating members 81 and 91 according to the present example embodiment may be installed between the first and second separating members 81 and 91 to be stably fixed inside the case 20 such that it is possible for the electrode assembly 10 to be physically and electrically separated from one side of the upper portion and the lower portion of the case 20.

Figure 5:
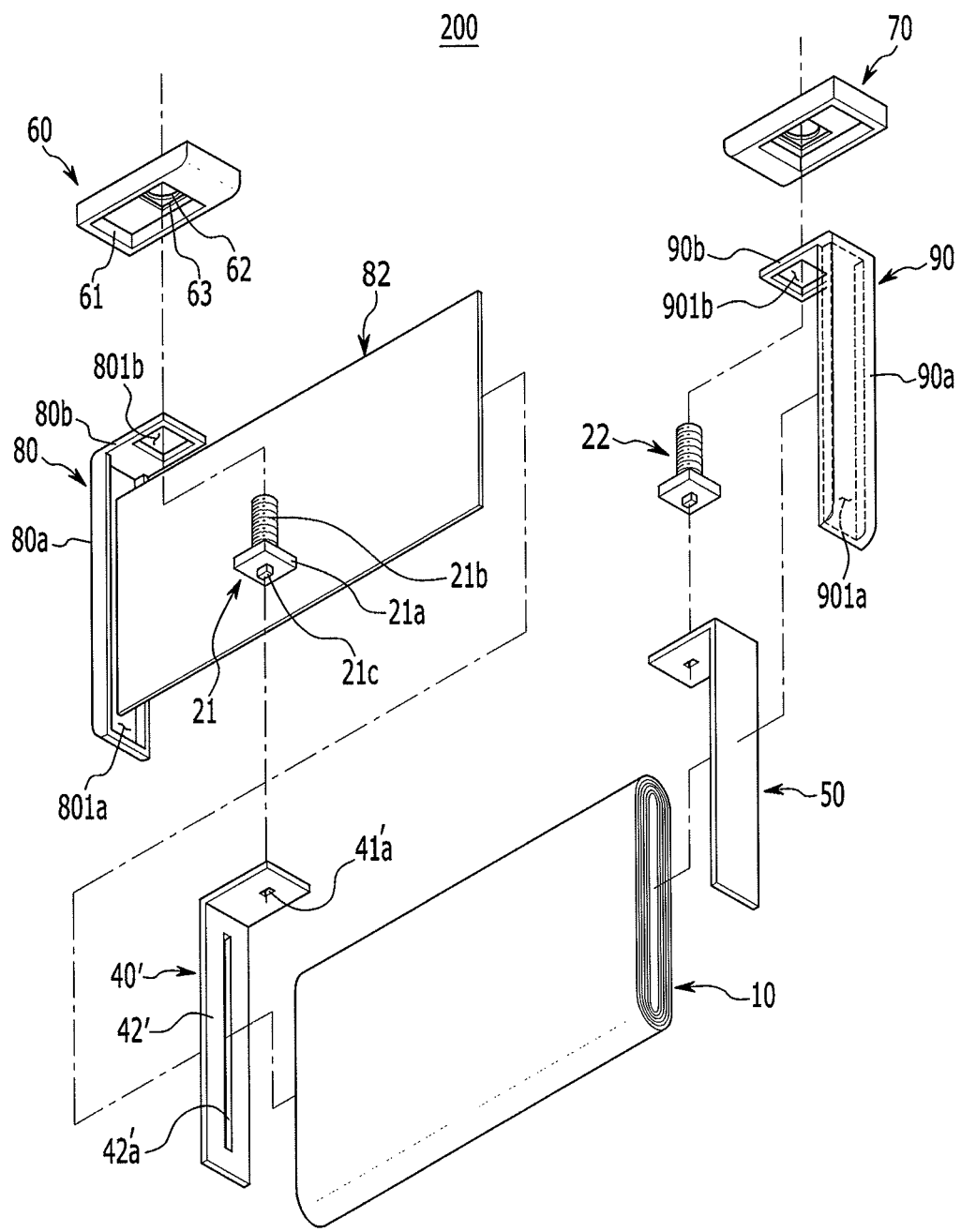
FIG. 5 illustrates a partial exploded perspective view of a rechargeable battery according to a second example embodiment.

FIG. 5 illustrates a partial exploded perspective view of a rechargeable battery according to the second example embodiment.

Referring to FIG. 5, the rechargeable battery 200 according to the present example embodiment has the same structure as the rechargeable battery 100 according to the first example embodiment, except for a fixing plate 82, such that the detailed description for the same structure as in the rechargeable battery 100 according to the first example embodiment is omitted.

The fixing plate 82 according to the present example embodiment may have a thin plate shape and may be coupled to one side of the first body portion 80*a* of the first separating member 80. In other implementations, the fixing plate 82 according to the present example embodiment can be coupled to one side of the second separating member 90 of the second body portion 90*a*, or may be extended at one side of each of the first and second separating members 80 and 90.

The coupling relation of the first and second separating members 80 and 90 and the electrode assembly 10 is the same as that of the rechargeable battery 100 according to the first example embodiment such that the detailed description of the first and second separating members 80 and 90 and the electrode assembly 10 is omitted.

As shown in FIG. 5, according to the present example embodiment, the fixing plate 82 fixed to one side of the first separating member 80 is passed through a current collector groove 42'*a*, which is formed at an electrode current collector coupling unit 42' of a positive current collector 40'. The fixing plate 82 may be inserted into a gap formed in the center of one surface of the electrode assembly 10 where the positive electrode uncoated region 11*a* is formed. The fixing plate 82 according to the present example embodiment may be made of the insulating material, for example an insulating resin.

According to the present example embodiment, the electrode assembly 10 may be supported between the first and second separating members 81 and 91 by the fixing plate 82 coupled to the first separating member 81. Thus, the electrode assembly 10 may be stably fixed inside the case 20.

In another implementation, the positive electrode 11, the negative electrode 12, and the fixing plate 82 may be interposed between the separator 13 and then spiral-wound to form the electrode assembly 10.

Figure 6:
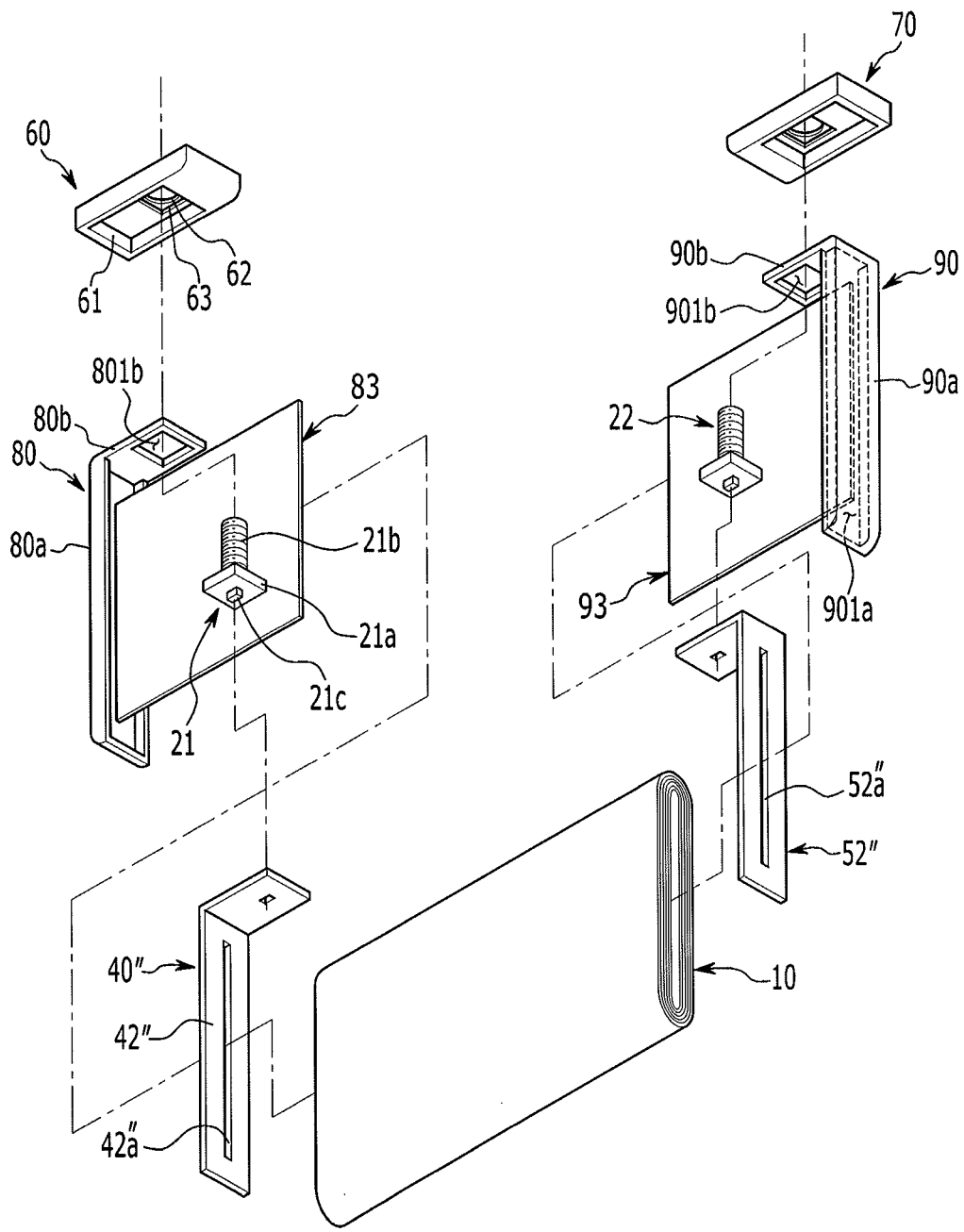
FIG. 6 illustrates a partial exploded perspective view of a rechargeable battery according to a variation according to the second example embodiment.

FIG. 6 illustrates a partial exploded perspective view of a rechargeable battery according to a variation of the second example embodiment.

Referring to FIG. 6, a rechargeable battery 201 according to the present example embodiment is the same as the rechargeable battery 100 according to the first example embodiment, except for a first fixing plate 83 and a second fixing plate 93 and positive and negative current collectors 40" and 50", such that the detailed description of the same structure is omitted.

The first and second fixing plates 83 and 93 according to the present example embodiment may be formed with a thin plate shape. The first fixing plate 83 may be coupled to one side of the first separating member 80. The second fixing plate 93 may be coupled to one side of the second separating member 90. The coupling relation of the first and second separating members 80 and 90 and the electrode assembly 10 is the same as that of the rechargeable battery 100 according to the first example embodiment such that the detailed description thereof is omitted.

As shown in FIG. 6, the fixing plate 83 coupled to one side of the first separating member 80 according to the present example embodiment may be passed through a current collector groove 42"*a* formed at an electrode current collector coupling unit 42" of the positive current collector 40". The fixing plate 83 may be inserted into a gap formed at the center of one surface of the electrode assembly 10 where the positive electrode uncoated region 11*a* is formed. The second fixing plate 93 coupled to one side of the second separating member 90 may be passed through a current collector groove 52"*a* formed at an electrode current collector coupling unit 52" of the negative current collector 50". The second fixing plate 93 may be inserted into a gap formed at the center of one surface of the electrode assembly 10 where the negative uncoated region 12*a* is formed. Accordingly, the first and second fixing plates 83 and 93 respectively coupled to the first and second separating members 80 and 90 may be inserted to both surfaces where the positive and negative uncoated regions 11*a* and 12*a* of the electrode assembly 10 are formed. Thus, the electrode assembly 10 may be stably fixed inside the case 20 and supported by the first and second fixing plates 83 and 93 between the first and second separating members 80 and 90.

Figure 7:
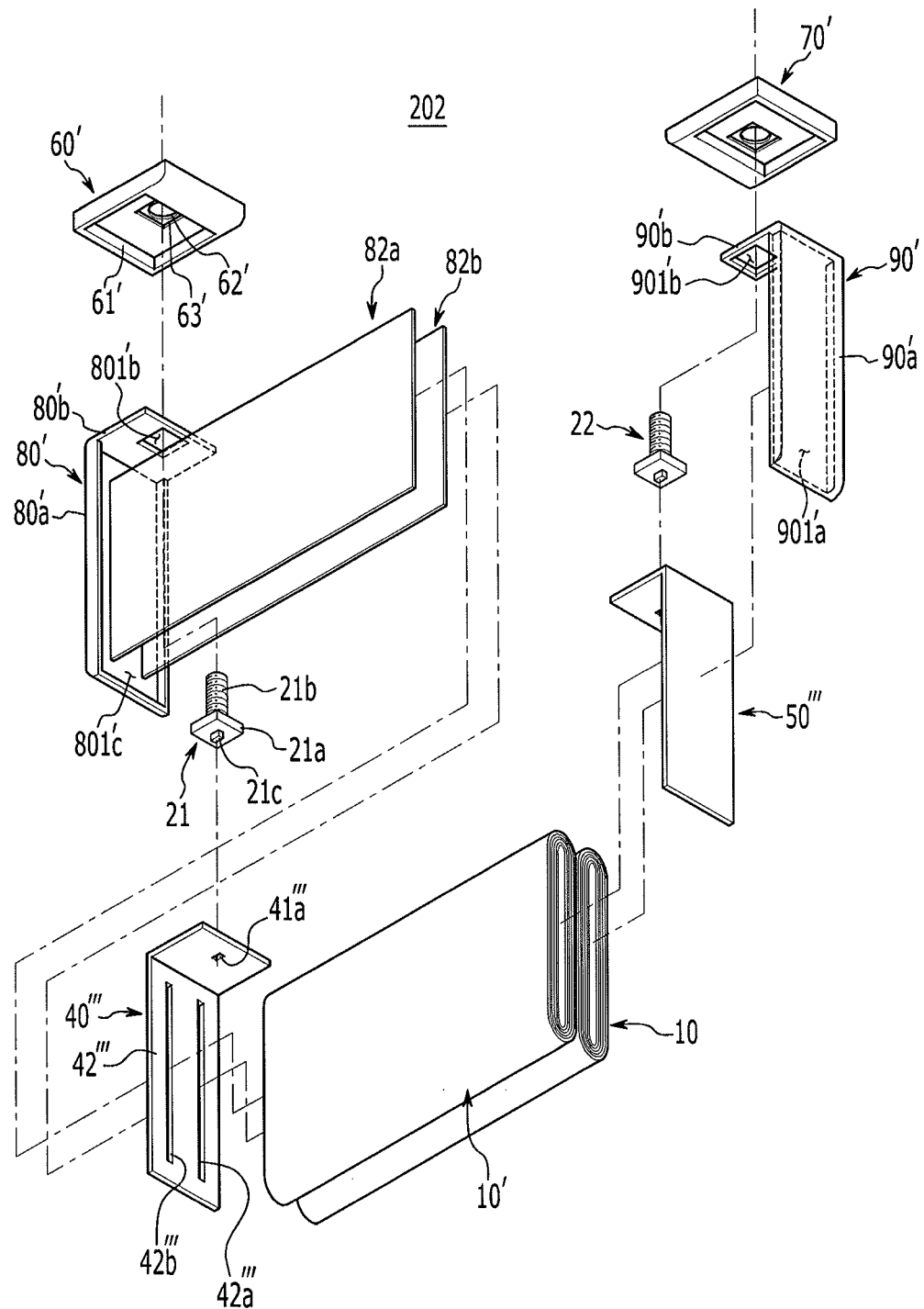
FIG. 7 illustrates a partial exploded perspective view of a rechargeable battery according to another variation according to the second example embodiment.

FIG. 7 illustrates a partial exploded perspective view of a rechargeable battery according to another variation according to the second example embodiment.

Referring to FIG. 7, a rechargeable battery 202 according to the present example embodiment may include the electrode assembly 10 and another electrode assembly 10'. A separating member 80' may include a fixing plate 82*b* and another fixing plate 82*a* extending from the separating member 80'. The fixing plate 82*b* may extend into a center region of the electrode assembly 10 and the other fixing plate 82*a* may extend into a center region of the other electrode assembly 10'. The fixing plates 82*a*, 82*b* may be configured to support the electrode assemblies 10', 10 along respective inner portions thereof.

The fixing plates 82*a*, 82*b* may be formed as an integral unit as part of the separating member 80'. The fixing plates 82*a*, 82*b*, and the separating member 80' may be formed of an electrically insulating material. The separating member 80' may have a body portion 80'*a*, a protrusion portion 80'*b*, and an electrode assembly receiving groove 801'*c*.

The fixing plates 82*a*, 82*b* may extend through respective openings 42'''*b*, 42'''*a* in a current collector 40'''. The current collector 40''' may have a body portion 42''' and a protrusion portion 41''' with a hole 41'''*a* therein, which may be used to couple to terminal 21. The terminal 21 may extend through an opening 801'b in the protrusion portion 80'b.

An insulating member 60' may include terminal through-hole 62', a current collector receiving groove 61', and a flange receiving groove 63'. Another insulating member 70' may correspond to another separating member 90a, which may include a body portion 90'a, a protrusion portion 90'b, an electrode assembly receiving groove 901'a, and a terminal fixing groove 901'b A current collector 50''' may be disposed in the electrode assembly receiving groove 901'a.

Figure 8:
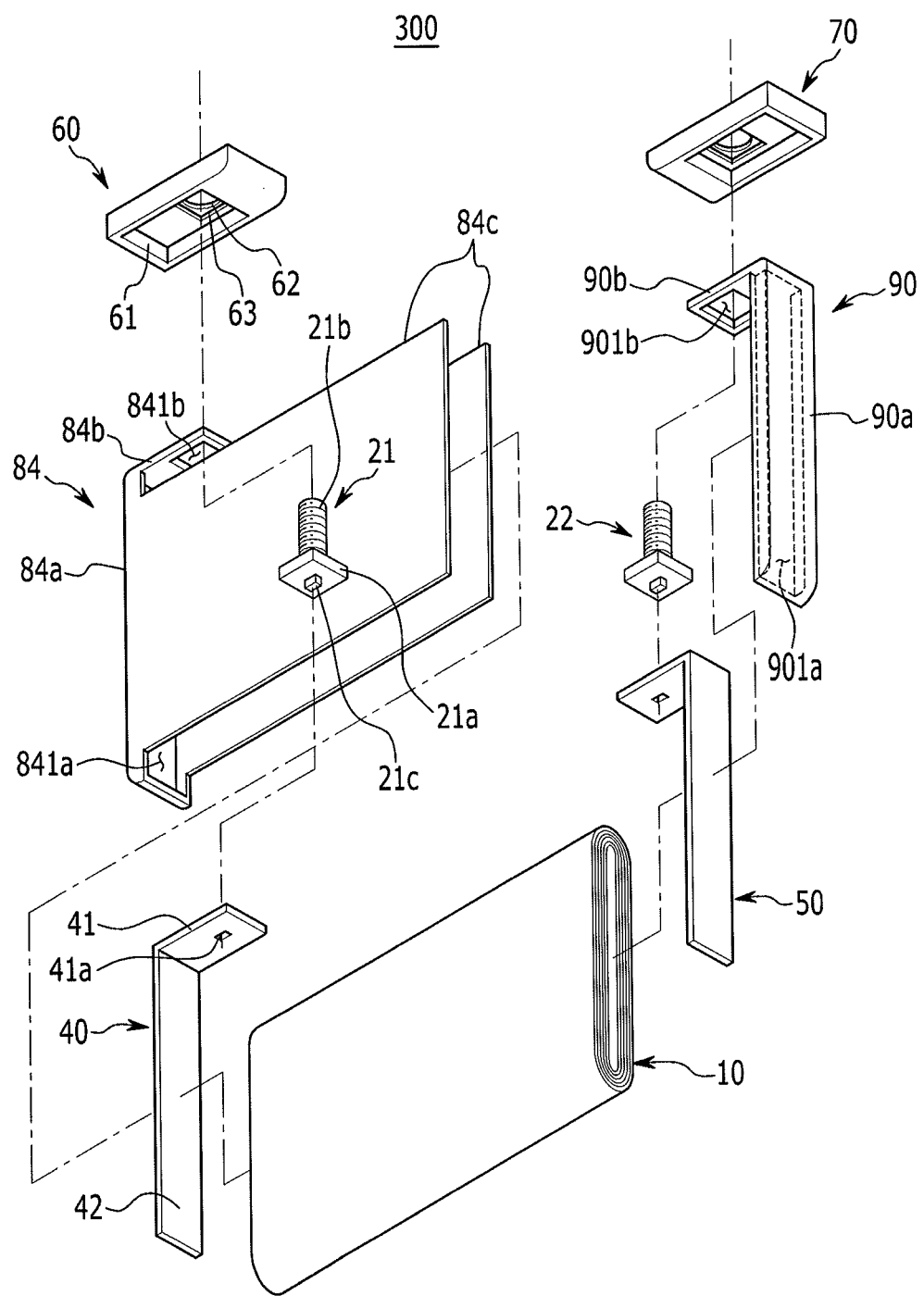
FIG. 8 illustrates a partial exploded perspective view of a rechargeable battery according to a third example embodiment.

FIG. 8 illustrates a partial exploded perspective view of a rechargeable battery according to the third example embodiment.

Referring to FIG. 8, a rechargeable battery 300 according to the present example embodiment is the same structure as the rechargeable battery 100 according to the first example embodiment, except for a first separating member 84, such that the detailed description of the same structure as in the rechargeable battery 100 according to the first example embodiment is omitted.

The first separating member 84 according to the present example embodiment may include a first body portion 84a and a first protrusion portion 84b that is formed with a positive terminal fixing groove 841b. The first body portion 84a of the first separating member 84 may include an electrode assembly receiving groove 841a, and a pair of first fixing walls 84c extending from facing edges of the electrode assembly receiving groove 841a. The first fixing walls 84c may be made of the insulating material, for example an insulating resin. In other implementations, the first fixing walls 84c according to the present example embodiment may be extended from the second separating member 90, or may be extended from the first and second separating members 84 and 90.

The coupling relation of the first and second separating members 84 and 90 and the electrode assembly 10 according to the present example embodiment is the same as the coupling relation of the first and second separating members 80 and 90 and the electrode assembly 10 according to the first example embodiment, except for the first fixing wall 84c formed at the first separating member 84, such that the detailed description is omitted.

As shown in FIG. 8, the electrode assembly 10 is inserted between a pair of first fixing walls 84c of the first body portion 84a of the first separating member 84 such that the electrode assembly receiving groove 841a may receive the portion of the electrode assembly 10 where the positive electrode uncoated region 11a is formed. Accordingly, according to the present example embodiment, the electrode assembly 10 may be physically and electrically separated from the case 20 by the first fixing wall 84c formed at the first separating member 84, and may be stably fixed inside the case 20.

Figure 9:
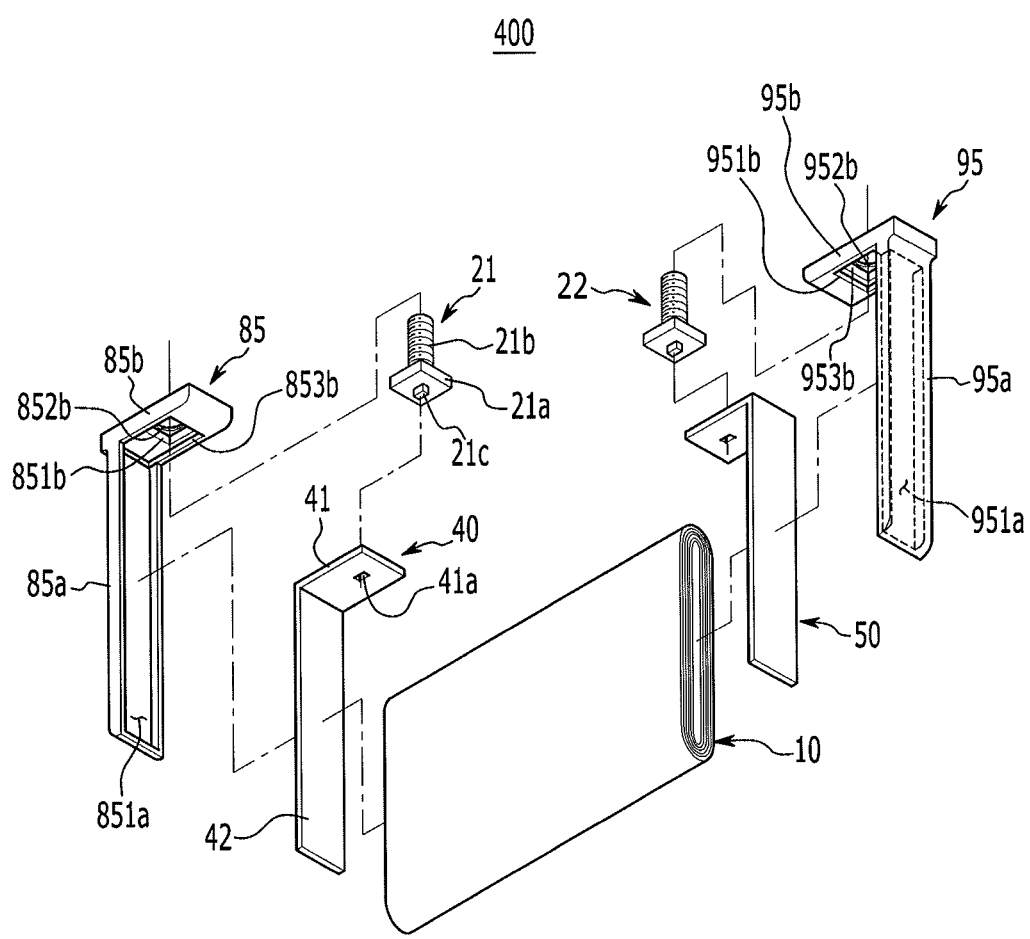
FIG. 9 illustrates a partial exploded perspective view of a rechargeable battery according to a fourth example embodiment.
Figure 10:
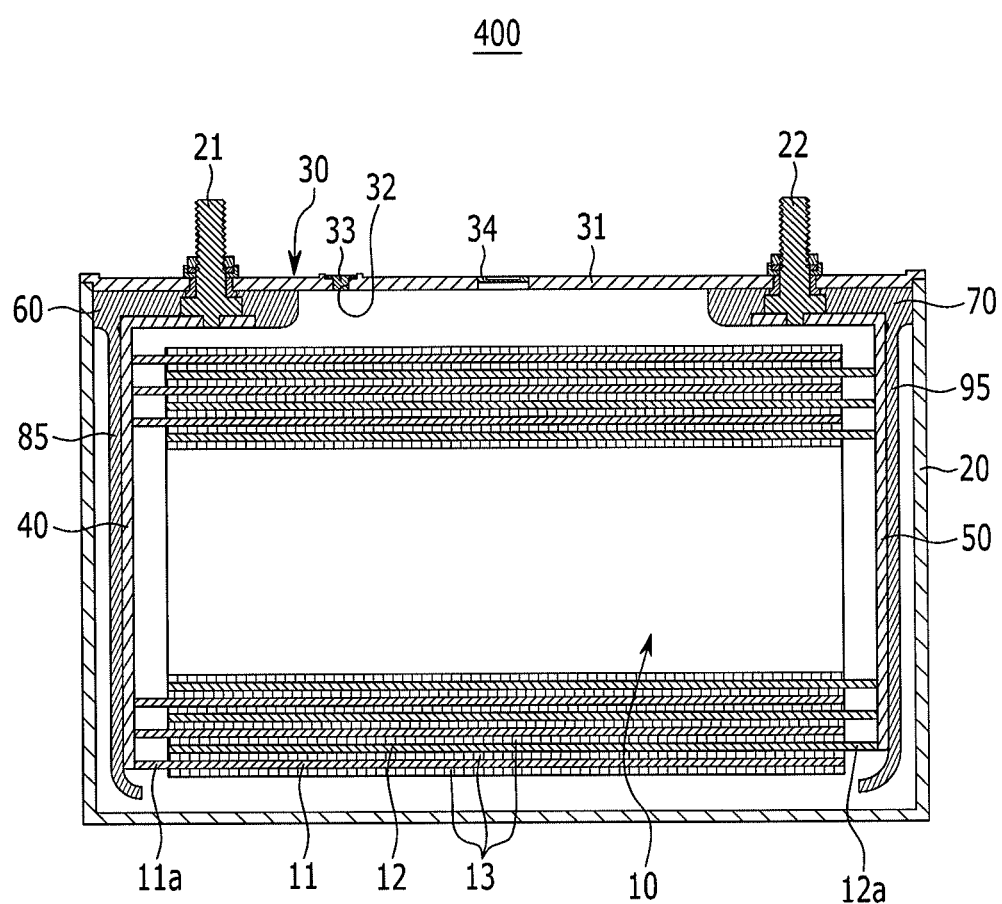
FIG. 10 illustrates a cross-sectional view of a rechargeable battery according to the fourth example embodiment.

FIG. 9 illustrates a partial exploded perspective view of a rechargeable battery according to the fourth example embodiment, and FIG. 10 illustrates a cross-sectional view of a rechargeable battery according to the fourth example embodiment.

Referring to FIG. 9 and FIG. 10, the rechargeable battery 400 according to the present example embodiment has the same structure as the rechargeable battery 100 according to the first example embodiment, except for first and second separating members 85 and 95, such that the detailed description of the same structure as in the first example embodiment is omitted.

The first and second separating members 85 and 95 according to the present example embodiment may include first and second bodies 85a and 95a, and first and second lower insulators 85b and 95b including first and second electrode assembly receiving grooves 851a and 951a. The first and second separating members 85 and 95 may be made of the insulating material, for example an insulating resin.

The first and second lower insulators 85b and 95b may include first and second current collector receiving grooves 851b and 951b, first and second flange receiving grooves 852b and 952b, and first and second terminal through-holes 853b and 953b. The first and second lower insulators 85b and 95b may be extended perpendicular to the first and second bodies 85a and 95a.

The first and second separating members 85 and 95 according to the present example embodiment may have the same structure such that the detailed description of the coupling relation of the second separating member 95, the electrode assembly 10, the negative terminal 22, and the negative current collector 50 is omitted.

According to the present example embodiment, the positive terminal 21 is passed through a first terminal through-hole 853b and may be fixed to the cap plate 31 by a nut, and the flange 21a may be received by the first flange receiving groove 852b. The terminal coupling groove 41a formed at the terminal coupling unit 41 of the current collector 40 may be inserted and welded with the coupling protrusion 21a. Accordingly, the first separating member 85 according to the present example embodiment may be fixed under the cap plate 31 by the flange 21a of the positive terminal 21.

As shown in FIG. 9, the first body portion 85a of the first separating member 85 according to the present example embodiment may be positioned between the case 20 and one surface of the electrode assembly 10 where the positive electrode uncoated region 11a coupled with the current collector 40 is positioned. Accordingly, the first and second separating members 85 and 95 may be positioned between the cap plate 31 and the electrode assembly 10 and both sides of the case. Thus, the electrode assembly 10 and the case 20 may be physically and electrically separated.

According to the present example embodiment, an external impact may be absorbed by the first and second separating members 85 and 95 such that damage to the electrode assembly 10 and leakage of the current generated in the electrode assembly 10 may be prevented.

Figure 11:
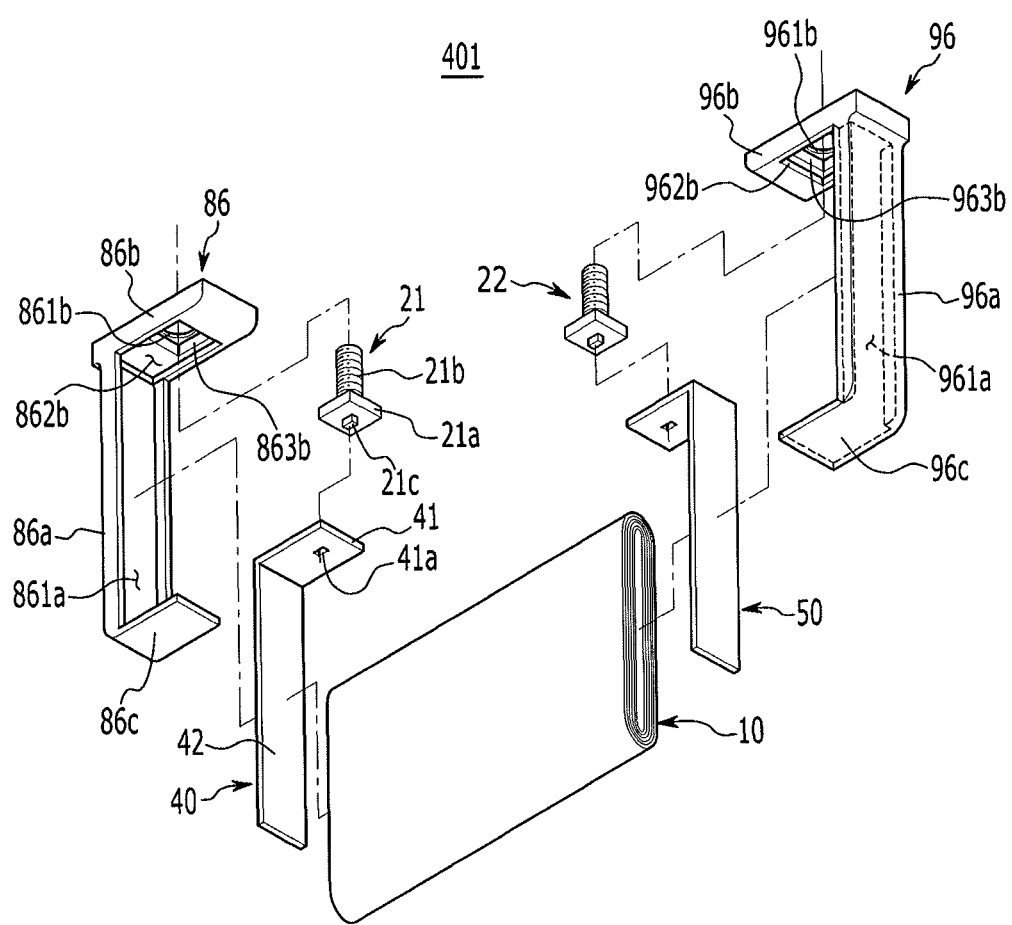
FIG. 11 illustrates a partial exploded perspective view of a rechargeable battery according to a variation according to the fourth example embodiment.

FIG. 11 illustrates a partial exploded perspective view of a rechargeable battery according to a variation according to the fourth example embodiment.

Referring to FIG. 11, the rechargeable battery 401 according to the present example embodiment has the same structure as the rechargeable battery 400 according to the fourth example embodiment, except for first and second separating members 86 and 96, such that the detailed description of the same structure is omitted.

The first and second separating members 86 and 96 according to the present example embodiment may include first and second bodies 86a and 96a (including first and second electrode assembly receiving grooves 861a and 961a) and first and second lower insulators 86b and 96b, and may be made of the insulating material, for example an insulating resin.

The first and second lower insulators 86b and 96b may include first and second current collector receiving grooves 861b and 961b, first and second flange receiving grooves 862b and 962b, and first and second terminal through-holes 863b and 963b. The first and second lower insulators 86b and 96b may be extended substantially perpendicular to the first and second bodies 86a and 96a.

The coupling relation of the first and second separating member 86 and 96 and the electrode assembly 10, the positive electrode and negative terminals 21 and 22, and the positive and negative current collectors 40 and 50 according to the present example embodiment is the same as the coupling relation between the first and second separating members 85 and 95 and the electrode assembly 10, the positive and negative terminals 21 and 22, and the positive and the negative current collectors 40 and 50 according to the fourth example embodiment, except for the first and second supporting units 86c and 96c. Accordingly, the detailed description of the coupling relation of the first and second separating members 86 and 96 and the electrode assembly 10, the positive and negative terminals 21 and 22, and the positive and negative current collectors 40 and 50 is omitted.

According to the present example embodiment, the first and second supporting units 86c and 96c of the first and second separating members 86 and 96 may be protruded at the other end positioned opposite to the end of the first and second bodies 86a and 96a where the first and second lower insulators 86b and 96b are positioned. The first and second supporting units 86c and 96c may be substantially perpendicular to the first and second bodies 86a and 96a. Accordingly, the first and second supporting units 86c and 96c according to the present example embodiment may be positioned between one surface of the lower portion of the electrode assembly 10 and the bottom surface of the case 20 such that the electrode assembly 10 and the case 20 may be physically separated.

The first and second separating members 86 and 96 according to the present example embodiment may be made of the insulating material, for example an insulating resin. According to the present example embodiment, the first and second supporting units 86c and 96c may be positioned between the electrode assembly 10 and the bottom portion of the case 20 such that the electrode assembly 10 and the case 20 may be electrically separated. As a result, the electrode assembly 10 may be installed between the first and second separating members 86 and 96, thereby being stably fixed inside the case 20 and being physically and electrically separated from one side, the upper portion, and the lower portion of the case 20.

By way of summation and review, a rechargeable battery may be formed in various shapes, e.g., a cylindrical shape, a rectangular shape, etc. A plurality of large capacity rechargeable batteries may be connected in series and used for driving a motor for an electric vehicle. In a rectangular or prismatic rechargeable battery, an electrode assembly housed within a case may be electrically connected to a current collector, and a terminal that protrudes outside the case may be electrically connected to the current collector such that a current generated in the electrode assembly may be provided to the outside. Where a space between the electrode assembly and the case is very small, an external impact on the case could be directly transmitted to the current collector, and the current collector could be damaged. Also, the current collector (combined to an uncoated region of the electrode assembly) and the case may become electrically connected to each other such that the current generated in the electrode assembly may be shorted to the case. However, according to embodiments, a separating member may protect the current collector in the event of an impact on the case, and may prevent the current collector from becoming electrically connected to the case in the event of such an impact. Similarly, the separator may protect the electrode assembly in the event of an impact on the case.

In some embodiments, a separating member may be combined with a fixing plate or fixing walls to provide support and/or protection for the electrode assembly. The electrode assembly may be stably fixed inside the case by the separating member. Also, a short circuit of current generated in the electrode assembly to the outside of the case may be prevented. Accordingly, embodiments may provide a rechargeable battery stably fixing an electrode assembly inside a case and preventing a current generated in the electrode assembly from shorting to the case. The separating member may electrically and/or physically separate one or more electrode assemblies from the case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery, comprising:
    an electrode assembly, the electrode assembly including a positive electrode, a negative electrode, and a separator interposed between the positive electrode and the negative electrode;
    a current collector, the current collector being electrically and mechanically coupled to one of the electrodes;
    a case, the electrode assembly and the current collector being disposed within the case;
    a cap plate, the cap plate having a terminal protruding therefrom, the terminal having a flange interposed between the cap plate and the current collector, the terminal being electrically coupled to the current collector; and
    a separating member, the separating member being electrically insulating, the separating member having a protrusion portion, a body portion, and a fixing plate, the protrusion portion having an opening through which the terminal flange passes and being fixed to the cap plate, the body portion extending along a length of the current collector and being interposed between the current collector and an inner wall of the case, and the fixing plate extending from the separating member beyond the current collector and into a center region of the electrode assembly.

2. The battery as claimed in claim 1, further comprising:
    another current collector, the other current collector being coupled to another one of the electrodes; and
    another separating member, the other separating member having a body portion extending along the other current collector and being interposed between the other current collector and another inner wall of the case.

3. The battery as claimed in claim 1, wherein:
    the case has an opening and a bottom interior surface, the opening being closed by the cap plate, and the bottom interior surface being opposite the opening, and
    the separating member includes a supporting unit extending from the separating member, the supporting unit extending along a bottom side of the electrode assembly, the bottom side of the electrode assembly being proximate to the bottom interior surface of the case.

4. The battery as claimed in claim 3, wherein the supporting unit is interposed between the bottom side of the electrode assembly and the bottom interior surface of the case.

5. The battery as claimed in claim 1, wherein the fixing plate is configured to support the electrode assembly along an inner portion thereof.

6. The battery as claimed in claim 1, further comprising another separating member, wherein the fixing plate extends toward another fixing plate in the center region of the electrode assembly, the other fixing plate extending from the other separating member.

7. The battery as claimed in claim 1, wherein the current collector is between the separating member and the electrode assembly, and the fixing plate extends through an opening in the current collector.

8. The battery as claimed in claim 1, wherein the fixing plate is electrically insulating.

9. The battery as claimed in claim 1, wherein the separating member and the fixing plate are formed as an integral unit.

10. The battery as claimed in claim 1, further comprising another electrode assembly, wherein the separating member includes another fixing plate extending from the separating member into a center region of the other electrode assembly.

11. The battery as claimed in claim 1, further comprising first and second fixing walls extending from the separating member, the first and second fixing walls extending along respective outer surfaces of the electrode assembly.

12. The battery as claimed in claim 11, wherein the fixing walls are configured to support the electrode assembly along the outer surfaces thereof.

13. The battery as claimed in claim 11, wherein the fixing walls are electrically insulating.

14. The battery as claimed in claim 1, wherein the battery is a prismatic secondary battery.

15. The battery as claimed in claim 1, further comprising an insulating member interposed between the protrusion portion and the cap plate.

16. The battery as claimed in claim 1, wherein the body portion has a receiving groove therein, the receiving groove being configured to receive the current collector.

17. The battery as claimed in claim 1, wherein the body portion and the protrusion portion have a receiving groove therein, the receiving groove being configured to receive the current collector in the body portion and the protrusion portion.

18. The battery as claimed in claim 17, wherein the protrusion portion contacts the cap plate.

19. A vehicle, comprising:
a power source, the power source providing a motive power for the vehicle; and
at least one rechargeable battery configured to provide electricity to the power source, the at least one rechargeable battery including:
an electrode assembly, the electrode assembly including a positive electrode, a negative electrode, and a separator interposed between the positive electrode and the negative electrode;
a current collector, the current collector being electrically and mechanically coupled to one of the electrodes;
a case, the electrode assembly and the current collector being disposed within the case;
a cap plate, the cap plate having a terminal protruding therefrom, the terminal having a flange interposed between the cap plate and the current collector, the terminal being electrically coupled to the current collector; and
a separating member, the separating member being electrically insulating, the separating member having a protrusion portion a body portion, and a fixing plate, the protrusion portion having an opening through which the terminal flange passes and being fixed to the cap plate, the body portion extending along a length of the current collector and being interposed between the current collector and an inner wall of the case, and the fixing plate extending from the separating member beyond the current collector and into a center region of the electrode assembly.

* * * * *